United States Patent
Liu (10) Patent No.: US 12,185,089 B2
(45) Date of Patent: Dec. 31, 2024

(54) INFORMATION PROCESSING METHOD, DEVICE AND APPARATUS, AND COMPUTER-READABLE STORAGE MEDIUM

(71) Applicant: DATANG MOBILE COMMUNICATIONS EQUIPMENT CO., LTD., Beijing (CN)

(72) Inventor: Aijuan Liu, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 394 days.

(21) Appl. No.: 17/634,429

(22) PCT Filed: Aug. 14, 2020

(86) PCT No.: PCT/CN2020/109242
§ 371 (c)(1),
(2) Date: Feb. 10, 2022

(87) PCT Pub. No.: WO2021/027932
PCT Pub. Date: Feb. 18, 2021

(65) Prior Publication Data
US 2022/0322167 A1    Oct. 6, 2022

(30) Foreign Application Priority Data
Aug. 15, 2019    (CN) .......................... 201910752479.7

(51) Int. Cl.
*H04W 36/00*    (2009.01)
*H04W 36/02*    (2009.01)

(52) U.S. Cl.
CPC .......................... *H04W 36/00698* (2023.05)

(58) Field of Classification Search
CPC ....... H04W 36/0069; H04W 36/00698; H04W 36/02
See application file for complete search history.

(56) References Cited

U.S. PATENT DOCUMENTS

2015/0257146 A1    9/2015    Xu et al.
2015/0312322 A1    10/2015    Kamat et al.
(Continued)

FOREIGN PATENT DOCUMENTS

CN    104902580 A    9/2015
CN    105848222 A    8/2016
(Continued)

OTHER PUBLICATIONS

Extended European Search Report dated Sep. 23, 2022 for Application No. 20852669.9.
(Continued)

*Primary Examiner* — Harry H Kim
(74) *Attorney, Agent, or Firm* — Harness, Dickey & Pierce, P.L.C.

(57) ABSTRACT

Provided in the embodiments are an information processing method, an information processing device, an apparatus, and a computer-readable storage medium. The information processing method includes: obtaining first information in the case that a handover process has been initiated for a UE in a DC state, the first information being used to indicate whether an SN supports direct data forwarding between the SN and a target node; and performing corresponding handover processing in accordance with the first information.

15 Claims, 4 Drawing Sheets

(56) References Cited

U.S. PATENT DOCUMENTS

| | | | | |
|---|---|---|---|---|
| 2016/0037421 | A1* | 2/2016 | Jokinen | H04W 36/22 |
| | | | | 455/436 |
| 2017/0181044 | A1 | 6/2017 | Wen et al. | |
| 2018/0014237 | A1 | 1/2018 | Xu et al. | |
| 2018/0115926 | A1 | 4/2018 | Wu et al. | |
| 2018/0376384 | A1* | 12/2018 | Youn | H04W 36/144 |
| 2020/0029389 | A1* | 1/2020 | Yilmaz | H04W 8/08 |
| 2020/0154320 | A1 | 5/2020 | Xu et al. | |
| 2021/0211960 | A1* | 7/2021 | Ryu | H04W 76/12 |
| 2021/0321474 | A1* | 10/2021 | Xu | H04W 36/00692 |
| 2022/0150763 | A1* | 5/2022 | Godin | H04W 76/16 |

FOREIGN PATENT DOCUMENTS

| | | |
|---|---|---|
| CN | 106162765 A | 11/2016 |
| CN | 108617020 A | 10/2018 |
| CN | 108811016 A | 11/2018 |
| WO | WO-2018/203300 A1 | 11/2018 |

OTHER PUBLICATIONS

ETSI TS 137 340 V15.6.0 (Jul. 2019), Universal Mobile Telecommunications System (UMTS): LTE; 5G; NR; Multi-connectivity; Overall description; Stage-2, (3GPP TS 37.340 version 15.6.0 Release 15).

Huawei, "Considerations on direct data forwarding", Agenda item 31.3.4.9, 3GPP TSG-RAN3 Meeting #101, R3-184621, Aug. 20-24, 2018, Gothenburg, Sweden.

Huawei, NTT Docomo, Inc., "Support of direct data forwarding", Change Request, 36.423, CR 1209 rev—Current version: 15.2.0, 3GPP TSG-RAN3 Meeting #101, R3-184622, Aug. 20-24, 2018, Gothenburg, Sweden.

Huawei, NTT Docomo, Inc."(TP for NR BL CR for TS 38.423) Support of direct data forwarding", Agenda item 31.3.4.9, 36.423, , 3GPP TSG-RAN3 Meeting #101, R3-184623, Aug. 20-24, 2018, Gothenburg, Sweden.

CATT, China Telecom, "Discussion on inter-system handover from EN-DC to SA", Agenda item 31.3.11, 3GPP TSG-RAN WG3 #105, R3-193707, Aug. 26-30, 2019, Ljublijana, Slovenia.

Chinese Office Action dated Jun. 16, 2021 for CN Application No. 201910752479.7.

Written Opinion and International Search Report dated Nov. 25, 2020 for PCT/CN2020/109242.

3GPP TS 37.340 V15.6.0 (Jun. 2019), 3rd Generation Partnership Project; Technical Specification Group Radio Access Network; Evolved Universal Terrestrial Radio Access (E-UTRA) and NR; Multi-connectivity; Stage 2, (Release 15); Copywrite 2019, 3GPP Organizational Partners.

Samsung, "Capture indirect and direct data forwarding in stage 2", 3GPP TSG-RAN Wg3 Meeting #84, R3-141253, May 19-23, 2014, Seoul, Korea.

* cited by examiner

INFORMATION PROCESSING METHOD, DEVICE AND APPARATUS, AND COMPUTER-READABLE STORAGE MEDIUM

CROSS-REFERENCE TO RELATED APPLICATIONS

This application is the U.S. national phase of PCT Application No. PCT/CN2020/109242 filed on Aug. 14, 2020, which claims a priority of the Chinese Patent Application No. 201910752479.7 filed in China on Aug. 15, 2019, which are incorporated herein by reference in their entireties.

TECHNICAL FIELD

The present disclosure relates to the field of communication technology, in particular to an information processing method, an information processing device, an apparatus, and a computer-readable storage medium.

BACKGROUND

In a Long Term Evolution (LTE) system, an Evolved Universal Terrestrial Radio Access Network (E-UTRAN) consists of a plurality of Evolved Node Bs (eNodeBs). The eNodeB is connected to an Evolved Packet Core Network (EPC) through an S1 interface, and the eNodeBs are connected to each other through an X2 interface. In order to support higher data throughput, Dual Connectivity (DC) may be achieved for a User Equipment (UE) through two eNodeBs. In a $5^{th}$-Generation (5G) system, similar to the DC in the LTE system, Multi-Radio Access Technology (RAT) Dual Connectivity (MR-DC) between the eNodeB and a New Radio (NR) Node B (gNB) as well as DC between two gNBs are supported.

In a handover process, for the UE, the DC may be changed to single connectivity, or from the single connectivity to the DC. In the related art, direct or indirect data forwarding is supported in the handover process, and each node may decide individually whether the direct or indirect data forwarding is to be performed in the handover process. However, a standard in the related art only supports that a Master Node (MN) notifies a Core Network (CN) whether the direct data forwarding is to be supported in an S1/Next Generation (NG) handover process, while it is impossible to perform the direct data forwarding between a Secondary Node (SN) and a target node. At this time, system perform is deteriorated in the handover process.

SUMMARY

An object of the present disclosure is to provide an information processing method, an information processing device, an apparatus, and a computer-readable storage medium, so as to prevent the deterioration of the system performance in the handover process.

In a first aspect, the present disclosure provides in some embodiments an information processing method for an MN, including: obtaining first information in the case that a handover process has been initiated for a UE in a DC state, the first information being used to indicate whether an SN supports direct data forwarding between the SN and a target node; and performing corresponding handover processing in accordance with the first information.

In a possible embodiment of the present disclosure, the obtaining the first information includes: transmitting a first request message to the SN, the first request message including information of the target node; and receiving a first response message, the first response message being transmitted by the SN in accordance with the information of the target node, the first response message including the first information.

In a possible embodiment of the present disclosure, the performing the corresponding handover processing in accordance with the first information includes: in an inter-system handover scenario, transmitting an indication indicating that the direct data forwarding is available to a Core Network (CN) in the case that a first condition has been met; obtaining an address of the direct data forwarding transmitted by the CN; and in the case that a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a possible embodiment of the present disclosure, the performing the corresponding handover processing in accordance with the first information includes: in an X2/Xn-based handover scenario, obtaining an address of the direct data forwarding from the target node; and in the case that a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN.

In a possible embodiment of the present disclosure, the performing the corresponding handover processing in accordance with the first information includes: in an S1-based handover scenario or a NG-based handover scenario, transmitting an indication indicating that the direct data forwarding is available to the CN in the case that a second condition has been met; obtaining an address of the direct data forwarding transmitted by the CN; and in the case that a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a second aspect, the present disclosure provides in some embodiments an information processing method for an SN, including transmitting first information to an MN in the case that the MN has initiated a handover process for a UE in a DC state, the first information being used to indicate whether the SN supports direct data forwarding between the SN and a target node.

In a possible embodiment of the present disclosure, the transmitting the first information to the MN includes: receiving a first request message transmitted by the MN, the first request message including information of the target node; and transmitting a first response message to the MN in accordance with the information of the target node, the first response message including the first information.

In a possible embodiment of the present disclosure, the method further includes: receiving an address of the direct data forwarding or an address of indirect data forwarding transmitted by the MN; and transmitting data in accordance with the address of the direct data forwarding or the address of the indirect data forwarding.

In a third aspect, the present disclosure provides in some embodiments an information processing device for an MN, including: an obtaining module configured to obtain first information in the case that a handover process has been initiated for a UE in a DC state, the first information being used to indicate whether an SN supports direct data forwarding between the SN and a target node; and a processing module configured to perform corresponding handover processing in accordance with the first information.

In a possible embodiment of the present disclosure, the obtaining module includes: a transmission sub-module configured to transmit a first request message to the SN, the first request message including information of the target node; and a reception sub-module configured to receive a first response message, the first response message being transmitted by the SN in accordance with the information of the target node, the first response message including the first information.

In a fourth aspect, the present disclosure provides in some embodiments an information processing device for an SN, including a processing module configured to transmit first information to an MN in the case that the MN has initiated a handover process for a UE in a DC state, the first information being used to indicate whether the SN supports direct data forwarding between the SN and a target node.

In a possible embodiment of the present disclosure, the processing module includes: a reception sub-module configured to receive a first request message transmitted by the MN, the first request message including information of the target node; and a transmission sub-module configured to transmit a first response message to the MN in accordance with the information of the target node, the first response message including the first information.

In a fifth aspect, the present disclosure provides in some embodiments a communication apparatus for an MN, including a transceiver, a memory, a processor, and a computer program stored in the memory and capable of being executed by the processor. The processor is configured to read the computer program stored in the memory to: obtain first information in the case that a handover process has been initiated for a UE in a DC state, the first information being used to indicate whether an SN supports direct data forwarding between the SN and a target node; and perform corresponding handover processing in accordance with the first information.

In a possible embodiment of the present disclosure, the processor is further configured to read the computer program stored in the memory to: transmit a first request message to the SN, the first request message including information of the target node; and receive a first response message, the first response message being transmitted by the SN in accordance with the information of the target node, the first response message including the first information.

In a possible embodiment of the present disclosure, the processor is further configured to read the computer program stored in the memory to: in an inter-system handover scenario, transmit an indication indicating that the direct data forwarding is available to a CN in the case that a first condition has been met; obtain an address of the direct data forwarding transmitted by the CN; in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a possible embodiment of the present disclosure, the processor is further configured to read the computer program stored in the memory to: in an X2/Xn-based handover scenario, obtain an address of the direct data forwarding from the target node; and in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN.

In a possible embodiment of the present disclosure, the processor is further configured to read the computer program stored in the memory to: in an S1-based handover scenario or a NG-based handover scenario, transmit the indication indicating that the direct data forwarding is available to the CN in the case that a second condition has been met; obtain an address of the direct data forwarding transmitted by the CN; and in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a seventh aspect, the present disclosure provides in some embodiments a communication apparatus for an SN, including a transceiver, a memory, a processor, and a computer program stored in the memory and capable of being executed by the processor. The processor is configured to read the computer program stored in the memory to transmit first information to an MN in the case that the MN has initiated a handover process for a UE in a DC state, and the first information is used to indicate whether the SN supports direct data forwarding between the SN and a target node.

In a possible embodiment of the present disclosure, the processor is further configured to read the computer program stored in the memory to: receive a first request message transmitted by the MN, the first request message including information of the target node; and transmit a first response message to the MN in accordance with the information of the target node, the first response message including the first information.

In a possible embodiment of the present disclosure, the processor is further configured to read the computer program stored in the memory to: receive an address of the direct data forwarding or an address of indirect data forwarding transmitted by the MN; and transmit data in accordance with the address of the direct data forwarding or the address of the indirect data forwarding.

In an eighth aspect, the present disclosure provides in some embodiments a computer-readable storage medium storing therein a computer program. The computer program is configured to be executed by a processor to implement steps in the above-mentioned information processing method in the first aspect, or steps in the above-mentioned information processing method in the second aspect.

According to the embodiments of the present disclosure, the first information indicating whether the SN supports direct data forwarding between the SN and the target node is obtained, and then the corresponding handover processing is performed. As a result, it is able to support the direct data forwarding between the SN and the target node in the handover scenario, thereby to improve the system performance in the handover process.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and thoroughly manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
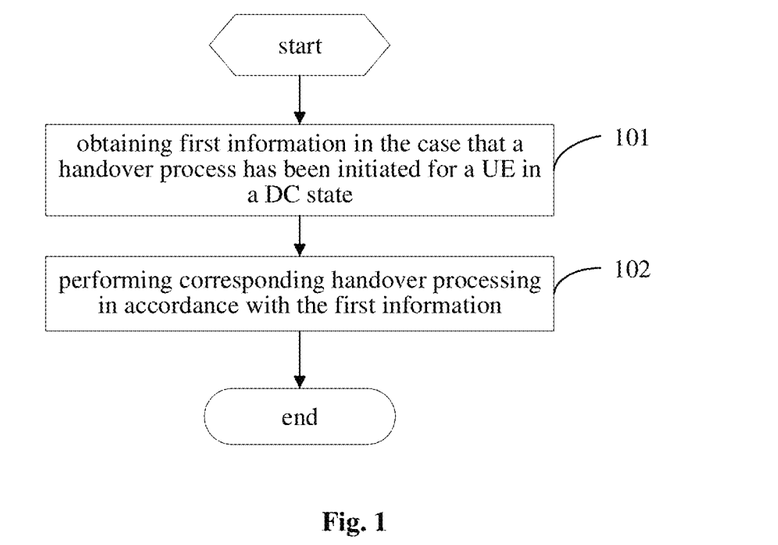
FIG. 1 is a flow chart of an information processing method according to an embodiment of the present disclosure.

The present disclosure provides in some embodiments an information processing method for an MN which, as shown in FIG. 1, includes the following steps.

Step 101: obtaining first information in the case that a handover process has been initiated for a UE in a DC state, the first information being used to indicate whether an SN supports direct data forwarding between the SN and a target node.

In the embodiments of the present disclosure, the MN transmits a first request message to the SN, and the first request message includes information of the target node. Then, the MN receives a first response message, the first response message being transmitted by the SN in accordance with the information of the target node, and the first response message includes the first information.

Step 102: performing corresponding handover processing in accordance with the first information.

The direct data forwarding is achieved between the SN and the target node through the handover processing. In this step, in order to meet the requirements on different handover scenarios, different handover processing modes are provided in different scenarios, so as to further improve handover performance of a system.

For example, in an inter-system handover scenario, the MN transmits an indication indicating that the direct data forwarding is available to a CN in the case that a first condition has been met, and obtains an address of the direct data forwarding transmitted by the CN. Then, in the case that a release process has been initiated to the SN, if the first information indicates that the SN supports the direct data forwarding between the SN and the target node, the MN transmits the address of the direct data forwarding to the SN; and if the first information indicates that the SN does not support the direct data forwarding between the SN and the target node, the MN allocates an address of indirect data forwarding for the SN, and transmits the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

For example, in an X2/Xn-based handover scenario, the MN obtains the address of the direct data forwarding from the target node. In the case that a release process has been initiated to the SN, if the first information indicates that the SN supports the direct data forwarding between the SN and the target node, the MN transmits the address of the direct data forwarding to the SN; and if the first information indicates that the SN does not support the direct data forwarding between the SN and the target node, the MN allocates an address of indirect data forwarding for the SN, and transmits the address of the indirect data forwarding to the SN.

For example, in an S1-based handover scenario or a NG-based handover scenario, the MN transmits the indication indicating that the direct data forwarding is available to the CN in the case that a second condition has been met, and obtains the address of the direct data forwarding from the CN.

In the case that a release process has been initiated to the SN, if the first information indicates that the SN supports the direct data forwarding between the SN and the target node, the MN transmits the address of the direct data forwarding to the SN; and if the first information indicates that the SN does not support the direct data forwarding between the SN and the target node, the MN allocates the address of the indirect data forwarding for the SN, and transmits the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

According to the embodiments of the present disclosure, the first information being used to indicate whether the SN supports direct data forwarding between the SN and the target node is obtained, and then the corresponding handover processing is performed. As a result, it is able to support the direct data forwarding between the SN and the target node in the handover scenario, thereby to improve the system performance in the handover process.

Figure 2:
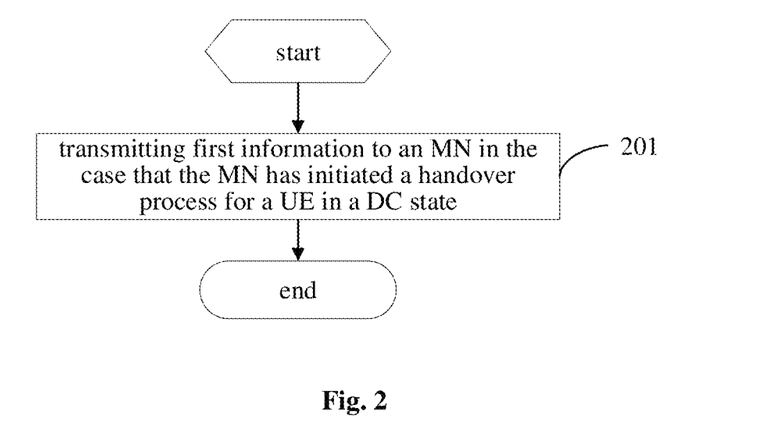
FIG. 2 is another flow chart of the information processing method according to an embodiment of the present disclosure.

The present disclosure further provides in some embodiments an information processing method for an SN which, as shown in FIG. 2, includes Step 201 of transmitting first information to an MN in the case that the MN has initiated a handover process for a UE in a DC state, and the first information is used to indicate whether the SN supports direct data forwarding between the SN and a target node.

Specifically, in Step 201, the SN receives a first request message transmitted by the MN, and the first request message includes information of the target node. Then, the SN transmits a first response message to the MN in accordance with the information of the target node, and the first response message includes the first information.

According to the embodiments of the present disclosure, the first information being used to indicate whether the SN supports direct data forwarding between the SN and the target node is obtained, and then the corresponding handover processing is performed. As a result, it is able to support the direct data forwarding between the SN and the target node in the handover scenario, thereby to improve the system performance in the handover process.

In a possible embodiment of the present disclosure, the information processing method further includes receiving, by the SN, an address of the direct data forwarding or an address of indirect data forwarding transmitted by the MN, and transmitting data in accordance with the address of the direct data forwarding or the address of the indirect data forwarding.

Figure 3:
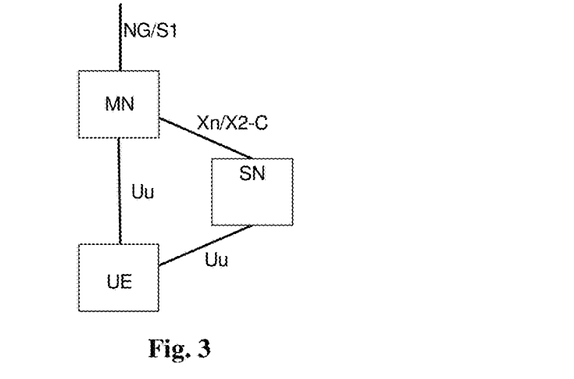
FIG. 3 is a schematic view showing DC architecture.

FIG. 3 is a schematic view showing DC architecture. In the DC architecture, there may be one MN and one or more SNs. Both the MN and the SN may be base station nodes supporting LTE/Evolved LTE (e-LTE)/New Radio (NR). The DC indicates that there are one MN and one SN.

The UE is simultaneously connected to the MN and the SN through an air interface. The MN and the SN are connected to each other through an Xn interface (for 5G Core Network (5GC)) or an X2-C interface (for Evolved Packet Core (EPC) core network). The MN is connected to the CN through an NG interface (for 5GC) or an S1 interface (for EPC core network). Through the dual (multiple) connectivity data transmission, it is able to improve data volume/throughput of the UE, thereby to meet a high-rate service transmission requirement.

An object of the present disclosure is to provide the information processing method to support direct data forwarding between the SN and the target node in the handover process in a DC/MR-DC scenario, and the implementation thereof will be described in conjunction with different scenarios hereinafter.

Figure 4:
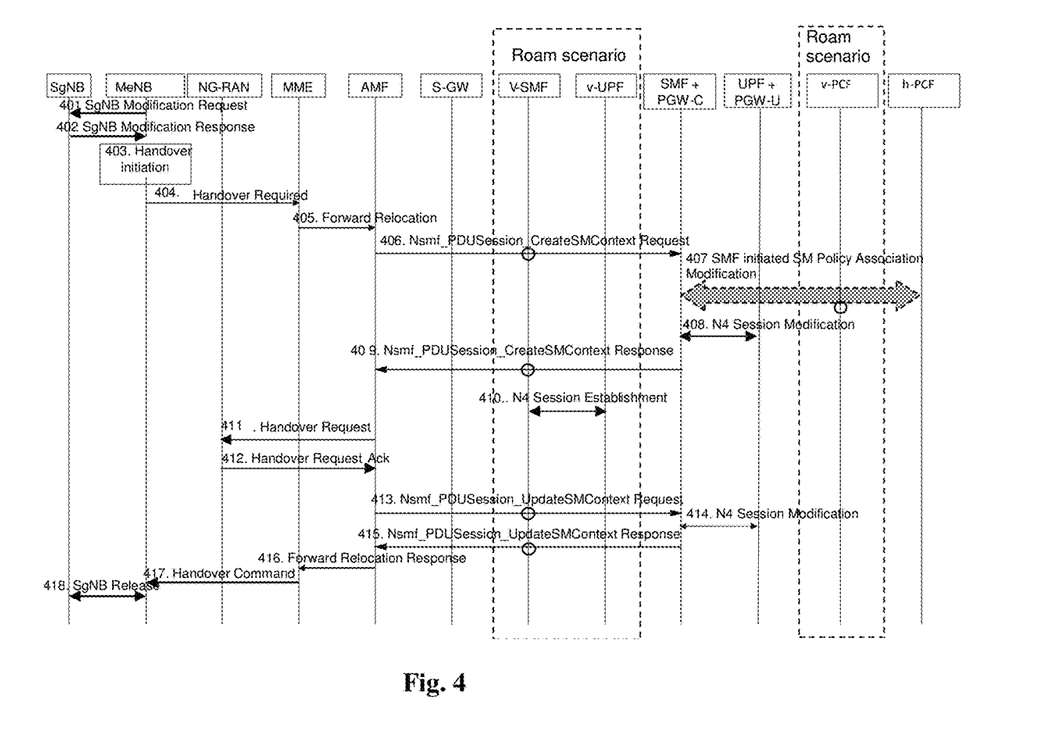
FIG. 4 is yet another flow chart of the information processing method according to an embodiment of the present disclosure.

As shown in FIG. 4, the UE operates in NG-RAN E-UTRA-NR Dual Connectivity (EN-DC), and a macro evolved nodeB (MeNB) (a source MN (S-MN) in FIG. 4) initiates an inter-rat handover process to an NG-RAN node in accordance with a measurement result. As shown in FIG. 4, the method includes the following steps.

Step 401: the S-MN determines to switch the UE to 5G (based on such information as the measurement result). The S-MN transmits a secondary gNB (SgNB) modification request message to the SN (SgNB) so as to request the SN to determine whether the SN supports the direct data forwarding between the SN and a target 5G node, and the SgNB modification request message carries an Identifier (ID) of the target 5G node.

Step 402: the SN carries information indicating whether the SN supports the direct data forwarding between the SN and the target 5G node in a SgNB modification response message.

Step 403: the S-MN initiates the handover process (handover initiation).

Step 404: the S-MN transmits a handover required message to a Mobility Management Entity (MME). The S-MN determines whether to carry an indication indicating that the direct data forwarding is available in the handover required message in accordance with a feedback from the SN and the whether the SN supports the direct data forwarding between the SN and the target node.

Step 405: the MME transmits a forward relocation request to an Access and Mobility Management Function (AMF).

Step 406 to Step 410: in the CN, an Evolved Packet System (EPS) bearer context at an MME side is converted into a Protocol Data Unit (PDU) session context adapted to a 5G System (5GS) after handshaking among a series of network elements of an EPS and the 5GC.

In Step 406, the AMF transmits Nsmf_PDUSession_CreateSMContext Request to a Session Management Function (SMF). In Step 407, the SMF and a home Policy Control Function (h-PCF) perform SMF initiated SM policy association modification. In Step 408, the SMF and a User Plane Function (UPF) perform N4 session modification. In Step 409, the SMF transmits Nsmf_PDUSession_CreateSMContext Response to the AMF. In Step 410, N4 session establishment is performed between visited SMF (v-SMF) and visited UPF (v-UPF).

Step 411: the AMF transmits a handover request message to a target NG-Radio Access Network (RAN) node, and the handover request message includes a source to target transparent container, Quality of Service (QoS) information corresponding to a resultant PDU session ID obtained through converting an EPS bearer, and whether the data forwarding is supported.

Step 412: the target NG-RAN node transmits a handover request acknowledge to the AMF, and the handover request acknowledge carries a target to source transparent container, an accepted PDU session, information of a QoS flow, and tunnel information allocated by the target NG-RAN node for the data forwarding.

Step 413 to Step 416: after handshaking among a series of network elements of the EPS and the 5GC, the address of the data forwarding allocated by the CN is transmitted to the MME.

In Step 413, the AMF transmits Nsmf_PDUSession_UpdateSMContext request to the SMF. In Step 414, N4 session modification is performed between the SMF and the UPF. In Step 415, the SMF transmits Nsmf_PDUSession_UpdateSMContext response to the AMF. In Step 416, the AMF transmits a forward relocation response to the MME.

Step 417: the MME transmits an address of the data forwarding to the S-MN through a handover command.

Step 418: when the S-MN initiates a release process to the SN, the source MN notifies an address of the data forwarding to the SN. If the SN supports the direct data forwarding between the SN and the target node, the S-MN directly forwards the address of the data forwarding received in the handover command to the SN; otherwise, the MN forwards the address of the data forwarding allocated by itself to the SN.

Then, the SN transmits data in accordance with the received address.

Figure 5:
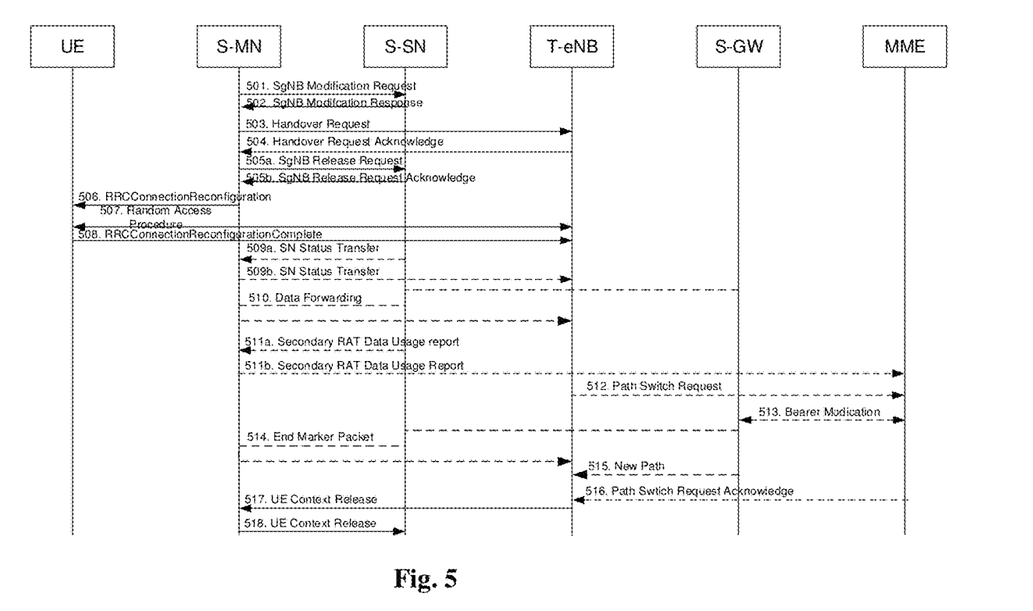
FIG. 5 is still yet another flow chart of the information processing method according to an embodiment of the present disclosure.

As shown in FIG. 5, the UE operates in EN-DC, and the MeNB (the S-MN in FIG. 5) initiates an X2-based handover process to a target eNB (T-eNB) in accordance with a measurement result. The method includes the following steps.

Step 501: the S-MN transmits a SgNB Modification request message to a source SN (S-SN) so as to request the S-SN to determine whether it supports the direct data forwarding between the S-SN and the T-eNB, and the message carries an ID of the T-eNB node.

Step 502: the S-SN carries information indicating whether the S-SN supports the direct data forwarding between the S-SN and the T-eNB node in a SgNB modification response message.

Step 503 and Step 504: the S-MN initiates a handover process to the T-eNB through transmitting a handover request message. In a handover request acknowledge, the T-eNB provides an address of the data forwarding.

Step 505a and Step 505b: the S-MN initiates a SgNB release process to the S-SN. The S-MN provides an address of the data forwarding for an SN-terminated Evolved Radio Access Bearer (E-RAB) in this process.

In Step 505a, the S-MN transmits a SgNB Release Request to the S-SN, and in Step 505b, the S-SN transmits a SgNB Release Request Acknowledge to the S-MN.

If the S-MN determines in Step 502 that the S-SN does not support the direct data forwarding between the S-SN and the T-eNB, the S-MN allocates and transmits an intermediate tunnel to the S-SN, and if the S-MN determines in Step 502 that the S-SN supports the direct data forwarding between the S-SN and the T-eNB, the S-MN directly transmits a tunnel allocated by the T-eNB to the S-SN.

Step 506: the S-MN transmits a Radio Resource Control (RRC) connection reconfiguration message (RRCConnectionReconfiguration) to the UE.

Step 507 and Step 508: the UE is synchronized with the T-eNB.

In Step 507, the UE and the T-eNB perform a random access procedure, and in Step 508, the UE transmits RCConnectionReconfigurationComplete to the T-eNB.

Step 509a and Step 509b: for the SN-terminated E-RAB, SN Status Transfer is forwarded by the S-SN to the S-MN, and then forwarded by the S-MN to the T-eNB.

Step 510: the S-SN performs the data forwarding.

Step 511a and Step 511b: the S-SN transmits a secondary data report (data report about second RAT) to the S-MN, and then the secondary data report is reported by the S-MN to the CN (MME).

Step 512 to Step 516: the T-eNB initiates a path switch process.

In Step 512, the T-eNB transmits a Path Switch Request to the CN; in Step 513, the MME and a Serving Gateway (S-GW) perform Bearer Modification; in Step 514, an End Marker Packet is executed between the S-GW and the T-eNB; in Step 515, the S-GW establishes a new path; and in Step 516, the MME transmits a Path Switch Request Acknowledge to the S-GW.

Step 517 and Step 518: the T-eNB initiates a UE Context Release process to the S-MN, the S-MN initiates a UE Context Release process to the S-SN, and the UE Context is determined at a source side.

Then, the SN transmits data in accordance with the received address.

Figure 6:
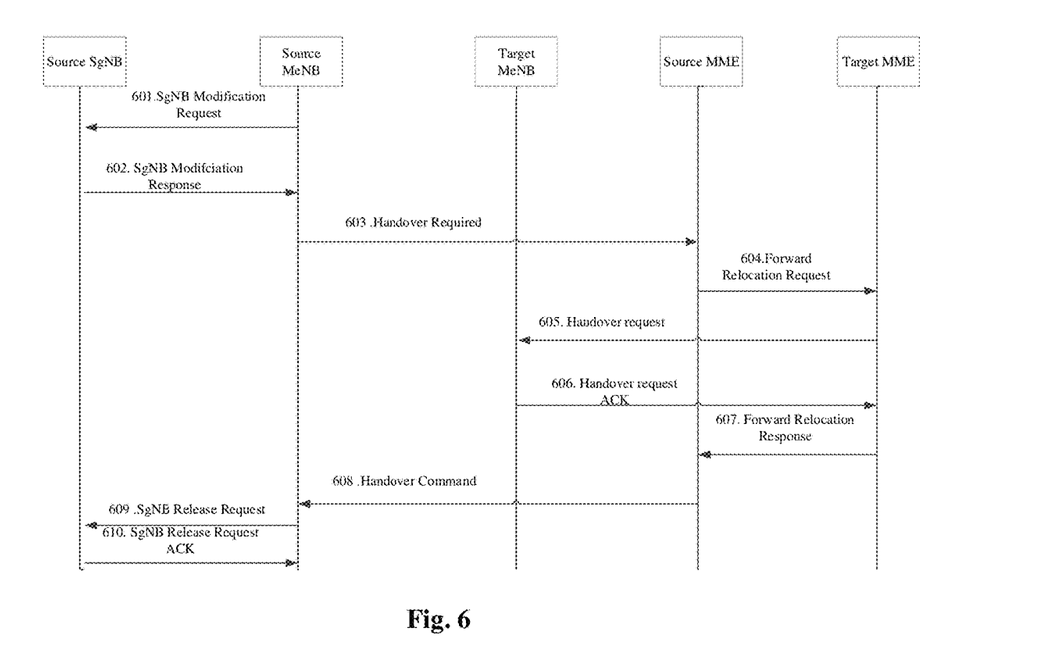
FIG. 6 is still yet another flow chart of the information processing method according to an embodiment of the present disclosure.

As shown in FIG. 6, the UE operates in EN-DC, and a Source MeNB (the S-MN in FIG. 6) initiates an S1-based handover process to the T-eNB in accordance with a measurement result. The method includes the following steps.

Step 601: the S-MN transmits a SgNB Modification request message to the SN (SgNB) so as to request the SN to determine whether it supports the direct data forwarding between the S-SN and the T-eNB, and the message carries an ID of the T-eNB.

Step 602: the SN carries information indicating whether the SN supports the direct data forwarding between the S-SN and the T-eNB in the SgNB modification response message.

Step 603: the S-MN initiates a handover process to a source MME through transmitting a handover required message, and in a handover request acknowledge, the S-MN notifies the MME whether the direct data forwarding is supported in the handover process in accordance with whether the S-MN supports the direct data forwarding with the T-eNb.

Step 604: the source MME transmits a Forward Relocation Request message to a target MME.

Step 605 and Step 606: the target MME transmits a handover request to the target MeNB, and the target MeNB transmits a handover request acknowledge to the target MME. The T-eNB returns the address of the data forwarding allocated by itself in a handover request response.

Step 607: the target MME transmits a forward relocation response message to the source MME.

Step 608: the source MME transmits a handover command message to the S-MN, and the message carries the address of the data forwarding.

Step 609 and Step 610: the S-MN initiates a SgNB release process to the SN. If the S-MN determines in Step 602 that the S-SN does not support the direct data forwarding between the S-SN and the T-eNB, an intermediate tunnel is allocated and transmitted to the SN, and if the S-MN determines in Step 602 that the S-SN supports the direct data forwarding between the S-SN and the T-eNB, the address of the data forwarding forwarded by the target MME is directly transmitted to the S-SN.

Then, the SN transmits data in accordance with the received address.

Figure 7:
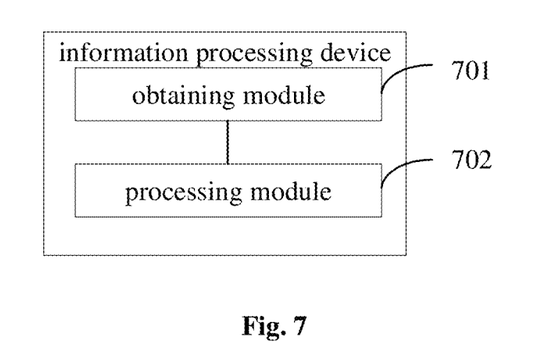
FIG. 7 is a schematic view showing an information processing device according to an embodiment of the present disclosure.

The present disclosure further provides in some embodiments an information processing device for an MN, as shown in FIG. 7. A principle of the information processing device for solving the problem is similar to that of the above-mentioned information processing method, so the implementation of the information processing device may refer to that of the information processing method and will thus not be further particularly defined herein.

As shown in FIG. 7, the information processing device includes: an obtaining module 701 configured to obtain first information in the case that a handover has been initiated for a UE in a DC state, the first information being used to indicate whether an SN supports direct data forwarding between the SN and a target node; and a processing module 702 configured to perform corresponding handover processing in accordance with the first information.

In a possible embodiment of the present disclosure, the obtaining module 701 includes: a transmission sub-module configured to transmit a first request message to the SN, the first request message including information of the target node; and a reception sub-module configured to receive a first response message, the first response message being transmitted by the SN in accordance with the information of the target node, the first response message including the first information.

In a possible embodiment of the present disclosure, the processing module 702 includes: a first transmission sub-module configured to, in an inter-system handover scenario, transmit an indication indicating that the direct data forwarding is available to a CN in the case that a first condition has been met; a first obtaining sub-module configured to obtain an address of the direct data forwarding transmitted by the CN; and a first processing sub-module configured to, in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a possible embodiment of the present disclosure, the processing module 702 includes: a second obtaining sub-module configured to, in an X2/Xn-based handover scenario, obtain an address of the direct data forwarding from the target node; and a second processing sub-module configured to, in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN.

In a possible embodiment of the present disclosure, the processing module 702 includes: a second transmission sub-module configured to, in an S1-based handover scenario or a NG-based handover scenario, transmit an indication indicating that the direct data forwarding is available to the CN in the case that a second condition has been met; a third obtaining sub-module configured to obtain an address of the direct data forwarding transmitted by the CN; and a third processing sub-module configured to, in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

The device in the embodiments of the present disclosure is used to implement the above-mentioned information processing method with a similar principle and a similar technical effect, which will thus not be further particularly defined herein.

Figure 8:
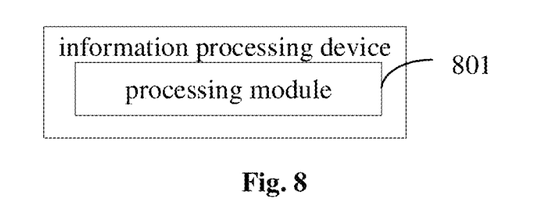
FIG. 8 is another schematic view showing the information processing device according to an embodiment of the present disclosure.

The present disclosure further provides in some embodiments an information processing device for an SN, as shown in FIG. 8. A principle of the information processing device for solving the problem is similar to that of the above-mentioned information processing method, so the implementation of the information processing device may refer to that of the information processing method and will thus not be further particularly defined herein.

As shown in FIG. 8, the information processing device includes a processing module 801 configured to transmit first information to an MN in the case that the MN has initiated a handover process for a UE in a DC state, and the first information is used to indicate whether the SN supports direct data forwarding between the SN and a target node.

In a possible embodiment of the present disclosure, the processing module 801 includes: a reception sub-module configured to receive a first request message transmitted by the MN, the first request message including information of the target node; and a transmission sub-module configured to transmit a first response message to the MN in accordance with the information of the target node, the first response message including the first information.

In a possible embodiment of the present disclosure, the device further includes: a reception module configured to receive an address of the direct data forwarding or an address of the indirect data forwarding transmitted by the MN; and a transmission module configured to transmit data in accordance with the address of the direct data forwarding or the address of the indirect data forwarding.

The device in the embodiments of the present disclosure is used to implement the above-mentioned information processing method with a similar principle and a similar technical effect, which will thus not be further particularly defined herein.

Figure 9:
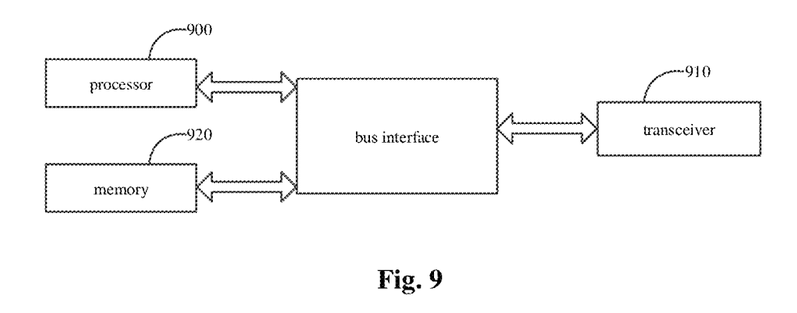
FIG. 9 is a schematic view showing a communication apparatus according to an embodiment of the present disclosure.

As shown in FIG. 9, the present disclosure further provides in some embodiments a communication apparatus for an MN which includes a processor 900, a transceiver 910 and a memory 920. The processor 900 is configured to read a computer program stored in the memory 920 so as to: obtain first information in the case that a handover process has been initiated for a UE in a DC state, the first information being used to indicate whether an SN supports direct data forwarding between the SN and a target node; and perform corresponding handover processing in accordance with the first information. The transceiver 910 is configured to receive and transmit data under the control of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. The processor 900 may take charge of managing the bus architecture as well as general processings. The memory 920 may store therein data for the operation of the processor 900.

The processor 900 may take charge of managing the bus architecture as well as general processings. The memory 920 may store therein data for the operation of the processor 900.

The transceiver 910 is further configured to: transmit a first request message to the SN, the first request message including information of the target node; and receive a first response message, the first response message being transmitted by the SN in accordance with the information of the target node, the first response message including the first information.

The processor 900 is further configured to read a computer program stored in the memory to: in an inter-system handover scenario, transmit an indication indicating that the direct data forwarding is available to a CN in the case that a first condition has been met; obtain an address of the direct data forwarding transmitted by the CN; in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

The processor 900 is further configured to read the computer program stored in the memory to: in an X2/Xn-based handover scenario, obtain an address of the direct data forwarding from the target node; and in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN.

The processor 900 is further configured to read the computer program stored in the memory to: in an S1-based handover scenario or a NG-based handover scenario, transmit the indication indicating that the direct data forwarding is available to the CN in the case that a second condition has been met; obtain an address of the direct data forwarding transmitted by the CN; and in the case that a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

Figure 10:
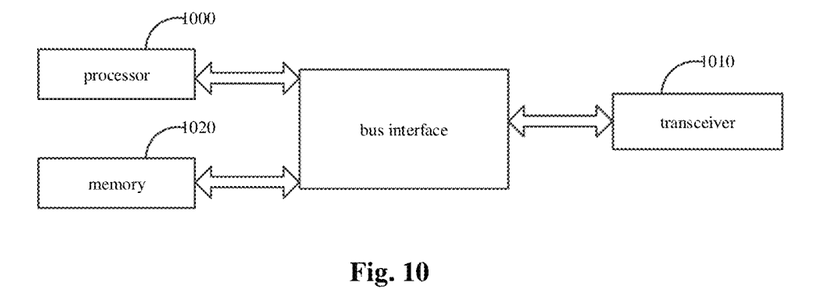
FIG. 10 is another schematic view showing the communication apparatus according to an embodiment of the present disclosure.

As shown in FIG. 10, the present disclosure further provides in some embodiments a communication apparatus for an SN which includes a processor 1000, a transceiver 1010 and a memory 1020. The processor 1000 is configured to read a computer program stored in the memory 1020 so as to transmit first information to an MN in the case that the MN has initiated a handover process for a UE in a DC state, and the first information is used to indicate whether the SN supports direct data forwarding between the SN and a target node. The transceiver 1010 is configured to receive and transmit data under the control of the processor 1000.

In FIG. 10, bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1010 may consist of a plurality of elements, i.e., a transmitter and a receiver for communication with any other devices over a transmission medium. The processor 1000 may take charge of managing the bus architecture as well as general processings. The memory 1020 may store therein data for the operation of the processor 1000.

The processor 1000 may take charge of managing the bus architecture as well as general processings. The memory 1020 may store therein data for the operation of the processor 1000.

The processor 1000 is further configured to read a computer program stored in the memory to: receive a first request message transmitted by the MN, the first request message including information of the target node; and transmit a first response message to the MN in accordance with the information of the target node, the first response message including the first information.

The processor 1000 is further configured to read the computer program stored in the memory to: receive an address of the direct data forwarding or an address of indirect data forwarding transmitted by the MN; and transmit data in accordance with the address of the direct data forwarding or the address of the indirect data forwarding.

The present disclosure further provides in some embodiments a computer-readable storage medium storing therein a computer program. The computer program is executed by a processor, so as to: obtain first information in the case that a handover process has been initiated for a UE in a DC state, the first information being used to indicate whether an SN supports direct data forwarding between the SN and a target node; and perform a corresponding handover processing in accordance with the first information.

In a possible embodiment of the present disclosure, the obtaining the first information includes: transmitting a first request message to the SN, the first request message including information of the target node; and receiving a first response message, the first response message being transmitted by the SN in accordance with the information of the target node, the first response message including the first information.

In a possible embodiment of the present disclosure, the performing the corresponding handover processing in accordance with the first information includes: in an inter-system handover scenario, transmitting an indication indicating that the direct data forwarding is available to a CN in the case that a first condition has been met; obtaining an address of the direct data forwarding transmitted by the CN; and in the case that a release process has been to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN. The first condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

In a possible embodiment of the present disclosure, the performing the corresponding handover processing in accordance with the first information further includes: in an X2/Xn-based handover scenario, obtaining an address of the direct data forwarding from the target node; and in the case that a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN.

In a possible embodiment of the present disclosure, the performing the corresponding handover processing in accordance with the first information further includes: in an S1-based handover scenario or a NG-based handover scenario, transmitting an indication indicating that the direct data forwarding is available to the CN in the case that a second condition has been met; obtaining an address of the direct data forwarding transmitted by the CN; and in the case of that a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN. The second condition includes at least one of the followings: that the first information indicates that the SN supports the direct data forwarding between the SN and the target node; that the MN supports the direct data forwarding between the MN and the target node; that the first information indicates that the SN supports the direct data forwarding between the SN and the target node, the MN does not support the direct data forwarding between the MN and the target node, and there is no bearer for the MN; and that the first information indicates that the SN does not support the direct data forwarding between the SN and the target node, and the MN supports the direct data forwarding between the MN and the target node.

The present disclosure further provides in some embodiments a computer-readable storage medium storing therein a computer program. The computer program is executed by a processor, so as to transmit first information to an MN in the case that the MN has initiated a handover process for a UE in a DC state, and the first information is used to indicate whether the SN supports direct data forwarding between the SN and a target node.

In a possible embodiment of the present disclosure, the transmitting first information to the MN includes: receiving a first request message transmitted by the MN, the first request message including information of the target node; and transmitting a first response message to the MN in accordance with the information of the target node, the first response message including the first information.

In a possible embodiment of the present disclosure, the method further includes: receiving an address of the direct data forwarding or an address of indirect data forwarding transmitted by the MN; and transmitting data in accordance with the address of the direct data forwarding or the address of the indirect data forwarding.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein computer program codes, e.g., a universal serial bus (USB) flash disk, a mobile hard disk (HD), a read-only memory (ROM), a random access memory (RAM), a magnetic disk or an optical disk.

It should be appreciated that, the units and the steps mentioned above may be implemented by hardware, or by hardware and software, depending on a specific application and a constraint condition. With respect to each specific application, different methods may be adopted so as to achieve the mentioned functions without departing from the scope of the present disclosure.

For convenience and clarification, the operational procedures of the system, device and units may refer to the above embodiments concerning the method, and thus will not be repeated herein.

It should be further appreciated that, the system, apparatus and method may be implemented in any other ways. For example, the embodiments for the apparatus is merely for illustrative purposes, and the units are provided merely on the basis of their logic functions. During the actual application, some units may be combined together or integrated into another system. Alternatively, some functions of the units may be omitted or not executed. In addition, the coupling connection, direct coupling connection or communication connection between the units may be implemented via interfaces, devices or units, and the indirect coupling connection or communication connection between the units may be implemented in an electrical or mechanical form or in any other form.

The units as separate components may be, or may not be, separated from each other physically, and the components may be, or may not be, physical units. They may be located at an identical position, or distributed over a plurality of network elements. All or parts of the components may be selected in accordance with the practical need so as to achieve the object of the present disclosure.

In addition, the functional units in the embodiments of the present disclosure may be integrated into a processing unit, or the functional units may exist independently, or two or more functional units may be combined together. The integrated functional units may be implemented in a hardware or software form.

In the case that the integrated functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium (a universal serial bus (USB) flash disk, a mobile hard disk (HD), a ROM, a RAM, a magnetic disk or an optical disk) and include several instructions so as to enable a computer equipment (a personal computer, a server or network equipment) to execute all or parts of the steps of the methods according to the embodiments of the present disclosure.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and executed by the processor. The memory is implemented inside or outside the processor.

The above are optional embodiments of the present disclosure. It should be appreciated that, for a person skilled in the art, improvements and modifications can be made without departing from the principles described in the present disclosure, and these modifications and improvements shall also fall within the scope of the present disclosure.

What is claimed is:

1. An information processing method for a Master Node (MN), comprising:
    obtaining first information in a case that a handover process has been initiated for a User Equipment (UE) in a Dual Connectivity (DC) state, the first information being used to indicate whether a Secondary Node (SN) supports direct data forwarding between the SN and a target node; and
    performing corresponding handover processing in accordance with the first information;
    wherein the obtaining the first information comprises:
        transmitting a first request message to the SN, the first request message comprising information of the target node; and
        receiving a first response message, the first response message being transmitted by the SN in accordance with the information of the target node, the first response message comprising the first information.

2. The information processing method according to claim 1, wherein the performing the corresponding handover processing in accordance with the first information comprises:
    in an inter-system handover scenario, transmitting an indication indicating that the direct data forwarding is available to a Core Network (CN) when a first condition has been met;
    obtaining an address of the direct data forwarding transmitted by the CN; and
    when a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN,
    wherein the first condition comprises at least one of the followings:
        that the first information indicates that the SN supports the direct data forwarding between the SN and the target node;
        that the MN supports the direct data forwarding between the MN and the target node;
        that the first information indicates that the SN supports the direct data forwarding between the SN and the target node, the MN does not support the direct data forwarding between the MN and the target node, and there is no bearer for the MN;
        that the first information indicates that the SN does not support the direct data forwarding between the SN and the target node, and the MN supports the direct data forwarding between the MN and the target node.

3. The information processing method according to claim 1, wherein the performing the corresponding handover processing in accordance with the first information, further comprises:
    in an X2/Xn-based handover scenario, obtaining an address of the direct data forwarding from the target node; and
    when a release process has been initiated to the SN, if the first information indicates that the SN supports the direct data forwarding between the SN and the target node, transmitting the address of the direct data forwarding to the SN; if the first information indicates that the SN does not support the direct data forwarding between the SN and the target node, allocating an address of indirect data forwarding for the SN, and transmitting the address of the indirect data forwarding to the SN.

4. The information processing method according to claim 1, wherein the performing the corresponding handover processing in accordance with the first information further comprises:
    in an S1-based or Next Generation (NG)-based handover scenario, transmitting an indication indicating that the direct data forwarding is available to the CN when a second condition has been met;
    obtaining an address of the direct data forwarding transmitted by the CN; and
    when a release process has been initiated to the SN, if the first information indicates that the SN supports the direct data forwarding between the SN and the target node, transmitting the address of the direct data forwarding to the SN;
    and if the first information indicates that the SN does not support the direct data forwarding between the SN and the target node, allocating an address of indirect data forwarding for the SN, and transmitting the address of the indirect data forwarding to the SN,
    wherein the second condition comprises at least one of the followings:
        that the first information indicates that the SN supports the direct data forwarding between the SN and the target node;
        that the MN supports the direct data forwarding between the MN and the target node;
        that the first information indicates that the SN supports the direct data forwarding between the SN and the target node, the MN does not support the direct data forwarding between the MN and the target node, and there is no bearer for the MN;
        that the first information indicates that the SN does not support the direct data forwarding between the SN and the target node, and the MN supports the direct data forwarding between the MN and the target node.

5. A non-transitory computer-readable storage medium storing therein a computer program, wherein the computer program is configured to be executed by a processor to implement steps in the information processing method according to claim 1.

6. The non-transitory computer-readable storage medium according to claim 5, wherein the performing the corresponding handover processing in accordance with the first information comprises:

in an inter-system handover scenario, transmitting an indication indicating that the direct data forwarding is available to a Core Network (CN) when a first condition has been met;

obtaining an address of the direct data forwarding transmitted by the CN; and when a release process has been initiated to the SN, if the first information indicates that the SN supports the direct data forwarding between the SN and the target node, transmitting the address of the direct data forwarding to the SN; and if the first information indicates that the SN does not support the direct data forwarding between the SN and the target node, allocating an address of indirect data forwarding for the SN, and transmitting the address of the indirect data forwarding to the SN, wherein the first condition comprises at least one of the followings:

that the first information indicates that the SN supports the direct data forwarding between the SN and the target node;

that the MN supports the direct data forwarding between the MN and the target node;

that the first information indicates that the SN supports the direct data forwarding between the SN and the target node, the MN does not support the direct data forwarding between the MN and the target node, and there is no bearer for the MN;

that the first information indicates that the SN does not support the direct data forwarding between the SN and the target node, and the MN supports the direct data forwarding between the MN and the target node.

7. The non-transitory computer-readable storage medium according to claim 5, wherein the performing the corresponding handover processing in accordance with the first information, further comprises:

in an X2/Xn-based handover scenario, obtaining an address of the direct data forwarding from the target node; and when a release process has been initiated to the SN, if the first information indicates that the SN supports the direct data forwarding between the SN and the target node, transmitting the address of the direct data forwarding to the SN; if the first information indicates that the SN does not support the direct data forwarding between the SN and the target node, allocating an address of indirect data forwarding for the SN, and transmitting the address of the indirect data forwarding to the SN.

8. An information processing method for a Secondary Node (SN), comprising:

transmitting first information to a Master Node (MN) in a case that the MN has initiated a handover process for a User Equipment (UE) in a Dual Connectivity (DC) state, the first information being used to indicate whether the SN supports direct data forwarding between the SN and a target node;

wherein the transmitting first information to the MN comprises:

receiving a first request message transmitted by the MN, the first request message comprising information of the target node; and transmitting a first response message to the MN in accordance with the information of the target node, the first response message comprising the first information.

9. The information processing method according to claim 8, further comprising:

receiving an address of the direct data forwarding or an address of indirect data forwarding transmitted by the MN; and transmitting data in accordance with the address of the direct data forwarding or the address of the indirect data forwarding.

10. A communication apparatus for an SN, comprising a transceiver, a memory, a processor, and a computer program stored in the memory and capable of being executed by the processor, wherein the processor is configured to read the computer program stored in the memory to implement steps in the information processing method according to claim 8.

11. The communication apparatus according to claim 10, wherein the processor is further configured to read the computer program stored in the memory to:

receive an address of the direct data forwarding or an address of indirect data forwarding transmitted by the MN;

transmit data in accordance with the address of the direct data forwarding or the address of the indirect data forwarding.

12. A communication apparatus for a Master Node (MN), comprising a transceiver, a memory, a processor, and a computer program stored in the memory and capable of being executed by the processor, wherein the processor is configured to read the computer program stored in the memory to:

obtain first information in a case that a handover process has been initiated for a User Equipment (UE) in a Dual Connectivity (DC) state, the first information being used to indicate whether a Secondary Node (SN) supports direct data forwarding between the SN and a target node; and perform corresponding handover processing in accordance with the first information;

wherein the processor is further configured to read the computer program stored in the memory to:

transmit a first request message to the SN, the first request message comprising information of the target node; and receive a first response message, the first response message being transmitted by the SN in accordance with the information of the target node, the first response message comprising the first information.

13. The communication apparatus according to claim 12, wherein the processor is further configured to read the computer program stored in the memory to:

in an inter-system handover scenario, transmit an indication indicating that the direct data forwarding is available to a CN when a first condition has been met;

obtaining an address of the direct data forwarding transmitted by the CN; and when a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN, wherein the first condition comprises at least one of the followings:

that the first information indicates that the SN supports the direct data forwarding between the SN and the target node;

that the MN supports the direct data forwarding between the MN and the target node;

that the first information indicates that the SN supports the direct data forwarding between the SN and the target node, the MN does not support the direct data forwarding between the MN and the target node, and there is no bearer for the MN;

that the first information indicates that the SN does not support the direct data forwarding between the SN and the target node, and the MN supports the direct data forwarding between the MN and the target node.

14. The communication apparatus according to claim 12, wherein the processor is further configured to read the computer program stored in the memory to:

in an X2/Xn-based handover scenario, obtain an address of the direct data forwarding from the target node; and when a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN.

15. The communication apparatus according to claim 12, wherein the processor is further configured to read the computer program stored in the memory to:

in an S1-based handover scenario or a NG-based handover scenario, transmit the indication indicating that the direct data forwarding is available to the CN when a second condition has been met;

obtain an address of the direct data forwarding transmitted by the CN; and when a release process has been initiated to the SN, if the first information indicates that the SN supports the direct data forwarding between the SN and the target node, transmit the address of the direct data forwarding to the SN; and if the first information indicates that the SN does not support the direct data forwarding between the SN and the target node, allocate an address of indirect data forwarding for the SN, and transmit the address of the indirect data forwarding to the SN, wherein the second condition comprises at least one of the followings:

that the first information indicates that the SN supports the direct data forwarding between the SN and the target node;

that the MN supports the direct data forwarding between the MN and the target node;

that the first information indicates that the SN supports the direct data forwarding between the SN and the target node, the MN does not support the direct data forwarding between the MN and the target node, and there is no bearer for the MN;

that the first information indicates that the SN does not support the direct data forwarding between the SN and the target node, and the MN supports the direct data forwarding between the MN and the target node.

\* \* \* \* \*